BEST AVAILABLE COPY

UNITED STATES PATENT OFFICE.

JOHN W. HYATT, JR., AND ISAIAH S. HYATT, OF NEWARK, NEW JERSEY, ASSIGNORS, BY MESNE ASSIGNMENTS, TO THE CELLULOID MANUFACTURING COMPANY, OF NEW YORK CITY.

IMPROVEMENT IN TREATING AND MOLDING PYROXYLINE.

Specification forming part of Letters Patent No. 105,338, dated July 12, 1870; reissue No. 5,928, dated June 23, 1874; application filed May 26, 1874.

*To all whom it may concern:*

Be it known that we, JOHN W. HYATT, Jr., and ISAIAH SMITH HYATT, late of Albany, New York, but now residing at Newark, in the county of Essex and State of New Jersey, have jointly invented certain new and useful Improvements in Processes of Converting Pyroxyline and Making Solid Collodion, of which invention the following is a specification:

Pyroxyline is one of the well-understood forms of nitro-cellulose—that is to say, it is cellulose which has been subjected to the action of sulphuric and nitric acids, and thereby rendered susceptible of transformation into collodion by the action of solvents. Now, it is the object of our invention to effect this transformation without the use and waste of expensive solutions or solvents, as heretofore, and with the smallest practicable proportion of the converting agent compatible with a rapid process, and a homogeneous product, the collodion resulting from our improved converting treatment of the pyroxyline being solidified, and in this form available as a substitute for horn, ivory, bone, &c., while at the same time it is capable of being rendered plastic by heat, of being, while in a plastic state, molded into any desired form or shape, and, after being thus molded, of resuming its hardness and retaining its shape.

Our invention is based upon our discovery, made in the course of our experiments toward the attainment of this object, of the fact that gum-camphor in a powdered or finely-comminuted state remains, under ordinary temperatures, inert when mechanically mixed with pyroxyline, of which, in solution or in a liquid state, it is, under ordinary temperatures, an active solvent; and of the further fact that, when such a mixture is subjected to heat above the ordinary temperatures, the camphor becomes an active converting agent, and transforms the pyroxyline into collodion as effectively as had been done with solutions. And these discoveries enable us to substitute a mechanical mixture for the solutions heretofore employed to keep the converting power latent or hold it in abeyance until its action can be developed under the best conditions, and with the best effect, instead of having to contend with the difficulties incident to the premature and partial action of solutions immediately upon coming in contact with the pyroxyline, and, while ultimately utilizing all the converting power of the camphor, to avoid the expense and loss of solvents, such as ether and alcohol, which were driven off or volatilized in the process of transformation. Other latent converting agents may be used in a similar way to effect a similar result.

Our invention, accordingly, consists in preparing pyroxyline and a latent converting agent for being mechanically mixed, and mixing them in such manner that the converting agent remains inert until the compound is subjected to a treatment that develops its converting power, and also in subjecting a compound of pyroxyline and a latent converting agent to a treatment which will develop the power of the converting agent, thereby transforming the pyroxyline into solidified collodion without the intervention of solutions or volatile solvents.

In the practice of our invention, we prepare pyroxyline by grinding it in water to a fine pulp in a machine such as is used in grinding paper-pulp. We strain off the water as far as practicable, and then subject this pulp to powerful pressure—for example, in a perforated vessel, to further expel the aqueous moisture, and to bring it to a comparatively solid and dry state, yet still retaining sufficient moisture to prevent it from burning in the further stages of the process.

We comminute gum-camphor by grinding it in water, or, preferably, by pounding or rolling it, and thoroughly incorporate, with the pyroxyline-pulp in the condition last-above described, this finely-comminuted camphor, in about the proportion of one part, by weight, of camphor to two parts, by weight, of the pyroxyline in the pulp. These proportions may, however, be somewhat varied with good results. The moisture in the pulp serves to counteract any tendency of the camphor to prematurely develop its converting power under any stimulus incident to its being incorporated with the pulp, or to the further stages of the process.

With the camphor we also thoroughly incorporate, with the pulp, any pigments, coloring matter, or other materials that may be adapted to the requirements of the articles into which the product is to be manufactured. The camphor, or camphor and other ingredients, having been thus thoroughly mixed with the pulp, we next subject the mass to a powerful pressure, in order to expel the remaining aqueous moisture, and thereby not only dry the mixture, but force the camphor into more intimate contact with the pyroxyline throughout the mass, so that every atom of the camphor shall be in condition and place to exert its utmost converting power as developed. The dried and compressed mass is next placed in a suitable mold or vessel open at the top, and into this open top is fitted a platen or plunger. The vessel is then placed in a hydraulic or other powerful press, and a heavy pressure, applied to the platen or plunger, is brought to bear upon the mixture, which, while thus under pressure, is heated up, by steam or other convenient means, to a temperature of from 150° to 300° Fahrenheit, varying according to the quantity of the mixture, and the mixture is kept at this temperature and under this pressure until the converting power of the camphor shall have been exerted upon the pyroxyline throughout the mass, the heat developing the latent converting power of the camphor, and the camphor exerting this converting power actively upon every atom of the pyroxyline, with which the pressure maintains it in close contact. The process of transformation is rapidly effected, and is completed almost as soon as the mass attains its maximum temperature, the resulting product being a homogeneous product, solidified collodion, or collodion compound having the qualities or properties hereinbefore specified. This product, as it comes from the press, is of a consistency resembling that of sole-leather, but upon exposure to the atmosphere it hardens, by reason of a slight evaporation of the camphor. The ultimate product includes, however, a large proportion of the camphor as a permanent accretion to the mass, which accretion is not only a great gain over the use of ether, alcohol, or other solutions or volatile solvents, which would be entirely expelled or lost, but by its presence gives the solidified collodion or compound the new capability of being again rendered plastic by heat, and remolded into any desired form or shape without requiring the use of solutions or volatile solvents, or the addition of fusible gums, as heretofore.

Having thus described the nature and object of our discovery and invention, what we claim, and desire to secure by Letters Patent, is—

1. The combination of pyroxyline with camphor gum, or any equivalent converting agent, in such manner that the transforming action of the converting agent is kept latent, substantially as and for the purposes set forth.

2. The method, substantially as herein described, of developing the latent power of the converting agent, by the application of heat to a mixture of pyroxyline and gum-camphor, or its equivalent, for the purposes set forth.

3. The method, substantially as herein described, of making solid collodion, by subjecting a mixture of pyroxyline and a latent solvent to heat and pressure.

4. The method, substantially as herein described, of converting pyroxyline into solid collodion, by the use of solid solvents.

5. The new material herein described, consisting of pyroxyline and gum-camphor, or its equivalent, with or without the addition of other substances to increase its body or change its color, the same being capable of being softened by heat and remolded or formed, as described.

JOHN W. HYATT, JR.
ISAIAH SMITH HYATT.

Witnesses:
CHAS. E. HILL,
RODERICK M. SANGER.